(12) United States Patent
Lawrence

(10) Patent No.: US 7,653,399 B2
(45) Date of Patent: Jan. 26, 2010

(54) WIDE AREA DIFFERENTIAL SATELLITE POSITIONING WITH LOCAL AREA UPDATES

(75) Inventor: David G. Lawrence, Santa Clara, CA (US)

(73) Assignee: Novariant, Inc., Fremont, CA (US)

( * ) Notice: Subject to any disclaimer, the term of this patent is extended or adjusted under 35 U.S.C. 154(b) by 411 days.

(21) Appl. No.: 11/315,657

(22) Filed: Dec. 22, 2005

(65) Prior Publication Data

US 2007/0149209 A1    Jun. 28, 2007

(51) Int. Cl.
*G06F 15/16* (2006.01)

(52) U.S. Cl. ............... 455/456.1; 342/357.12

(58) Field of Classification Search ........... 455/12.1, 455/13.2; 342/357.02, 357.12, 357.03; 45/456.1
See application file for complete search history.

(56) References Cited

U.S. PATENT DOCUMENTS

| | | | |
|---|---|---|---|
| 5,621,646 A | 4/1997 | Enge et al. | |
| 6,542,820 B2 | 4/2003 | LaMance et al. | |
| 6,560,534 B2 | 5/2003 | Abraham et al. | |
| 7,427,950 B2* | 9/2008 | Eslinger et al. | 342/357.03 |
| 2005/0232209 A1* | 10/2005 | Buckley et al. | 370/338 |
| 2007/0027627 A1* | 2/2007 | Lawrence et al. | 701/213 |

OTHER PUBLICATIONS

Landau, Herbert; Vollath, Ulrich; Chen, Xiaoming—"*Virtual Reference Station Systems*", Journal of Global Positioning Systems (2002), vol. 1, No. 2: 137-143 © CPGPS.

Higgins, Matthew B.; "*An Australian Pilot Project For A Real Time Kinematic GPS Network Using The Virtual Reference Station Concept*," New Technology For A New Century, International Conference, FIG Working Week 2001, Korea May 6-11, 2001.

OmniSTAR 8400 HP, "User Manual", Fugro, Issue 2.0, Jun. 2005.

Changdon Kee. *Wide Area Differential GPS*. 1994. Standford, California.

Satellite Journal International. *Satellite News VA* v1.5. Apr. 14, 2005. <http://www.sat-net.com/listserver/sat-na/msg00016.html>.

C. Rizos, T. Yan, S. Omar, T. Musa, D. Kinlyside. *Implementing Network-RTK: The SydNET CORS Infrastructure*. The 6th International Symposium on Satellite Navigation Technology Including Mobile Position & Location Services. Jun. 22-25, 2003. Melbourne, Australia.

Orbiter and Radio Metric Systems Group. *Real-Time GIPSY Software*. Apr. 14, 2005. <http://gipsy.jpl.nasa.gov/orms/rtg/index.html>.

Worldwide Digital Global Positioning Service—*Omnistar USA, Inc.—FAQ's*. Dec. 22, 2005 <http://www.omnistar.com/faq.html>.

* cited by examiner

*Primary Examiner*—Sam Bhattacharya
(74) *Attorney, Agent, or Firm*—Brinks, Hofer, Gilson & Lione

(57) ABSTRACT

Wide area corrections are used substantially continuously. Local area corrections are used once or sparsely. For example, an initial position is determined with local area corrections. Wide area corrections are subsequently used. The initial position information is used in the wide area position determination to limit or avoid delay for convergence. Other sparse uses of local area corrections include verifying or updating positions based on substantially continuous use of wide area corrections.

37 Claims, 2 Drawing Sheets

WIDE AREA DIFFERENTIAL SATELLITE POSITIONING WITH LOCAL AREA UPDATES

BACKGROUND

Many differential global position corrections networks exist, including FAA WAAS, OmniStar, JPL, USCG Beacons, local commercial networks, local community cooperatives networks, virtual reference station networks and local government funded networks. Differential corrections provide more accurate position determinations.

In wide area networks (e.g., WAAS, OmniStar, and Starfire), geosynchronous satellites provide differential correction information. The footprint of the beams from the geosynchronous satellites is large, resulting in a wide area network. A relative few, such as 10-30, reference stations are provided in any footprint of the geosynchronous satellites for hemisphere corrections. The reference stations send phase measurements on landlines to a central facility. The central facility provides the differential corrections to the geosynchronous satellites for beaming to mobile devices. Mobile receivers determine location with differential based accuracy from global positioning satellite (GPS) signals and the differential corrections. The closest reference station may be over 100 miles away from the mobile receiver.

For local area systems (e.g., USCG Beacons), terrestrial based communications provide differential corrections. One or more local reference stations transmit differential corrections on a radio transmitter or modem. Receivers within the range of the radio transmitter or modem calculate position based on the differential corrections received from the reference stations. Carrier phase based position determinations may provide about 2 or better inch accuracy. However, local area systems may not be generally available, may be more likely subject to interference from terrestrial structures and may be more costly to use than wide area networks.

Some local area systems provide wide area network position determination as a back up. Positions of the mobile receiver are continuously determined from local area differential corrections until failure of the local area network. For example, the mobile receiver uses the local area network until a building, hill or other structure blocks transmission of the local area differential information. Once a failure occurs, the mobile receiver uses the wide area network until the local area network is again available.

BRIEF SUMMARY

Wide area corrections are used substantially continuously, while local area corrections are used once or sparsely.

In a first aspect, a method is provided for determining a position with a wide area network and a local area supplement. Local area differential information is acquired and used for initializing or re-initializing a wide area differential navigation algorithm.

In a second aspect, a position receiver determines position with a wide area network and a local area supplement. The position receiver comprises a communications antenna operable to receive local area differential information. It also comprises a satellite antenna operable to receive signals from at least one navigation satellite. Further, it comprises a processor which initializes a wide-area differential navigation algorithm using the local area differential information and the signals.

In a third aspect, a method is provided for determining position with a wide area network and a local area supplement. Positions of a receiver are determined substantially continuously from satellite signals as a function of differential information obtained from the wide area network. At least one position of the receiver is determined sparsely in time using differential information obtained from a local area network.

In a fourth aspect, a receiver system determines position with a wide area network and a local area supplement. A communications antenna receives local area differential information. A satellite antenna receives signals from at least one navigation satellite. The two antennas are coupled to a processor, which substantially continuously determines positions of the satellite antenna from the signals from the at least one navigation satellite as a function of differential information from the wide area network, and sparsely determines at least one position of the satellite antenna using differential information from a local area network.

In a fifth aspect, a computer readable storage medium has stored therein data representing instructions executable by a programmed processor for determining position with a wide area network and a local area supplement. The instructions are for determining an initial differential position as a function of local area network differential information with or without wide area network differential information; and determining a first subsequent differential position as a function of wide area network differential information and the initial differential position; wherein the local area network differential information is used only during startup of wide area network based position determination.

The present invention is defined by the following claims and any later drafted claims supported by the description herein, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In the past, one typical approach for using differential corrections in determining location has been to rely predominantly on local area corrections during a navigation session. If local area corrections were not available due to data drop out during the navigation session, the system could fall back on wide area corrections.

According to the present disclosure, another approach may be used. To reduce or avoid costs or infrastructure installation in some situations, wide area network corrections are used while available, but local corrections are used more sparsely during the navigation session. The navigation session corresponds to a period of use of a receiver from powering on the receiver to powering down or cessation of use of the receiver, such as a navigation session lasting for an entire workday or over a time to complete an operation or portion of an operation. Local corrections are used to save time initializing the wide area determinations or when wide area corrections are not available. The wide area system is the primary system for differential corrections, and the local area system is used as a fall back or initializing system for differential corrections. By relying less on the local area system, any unreliability of differential corrections from the local area system may be minimized.

Figure 1:
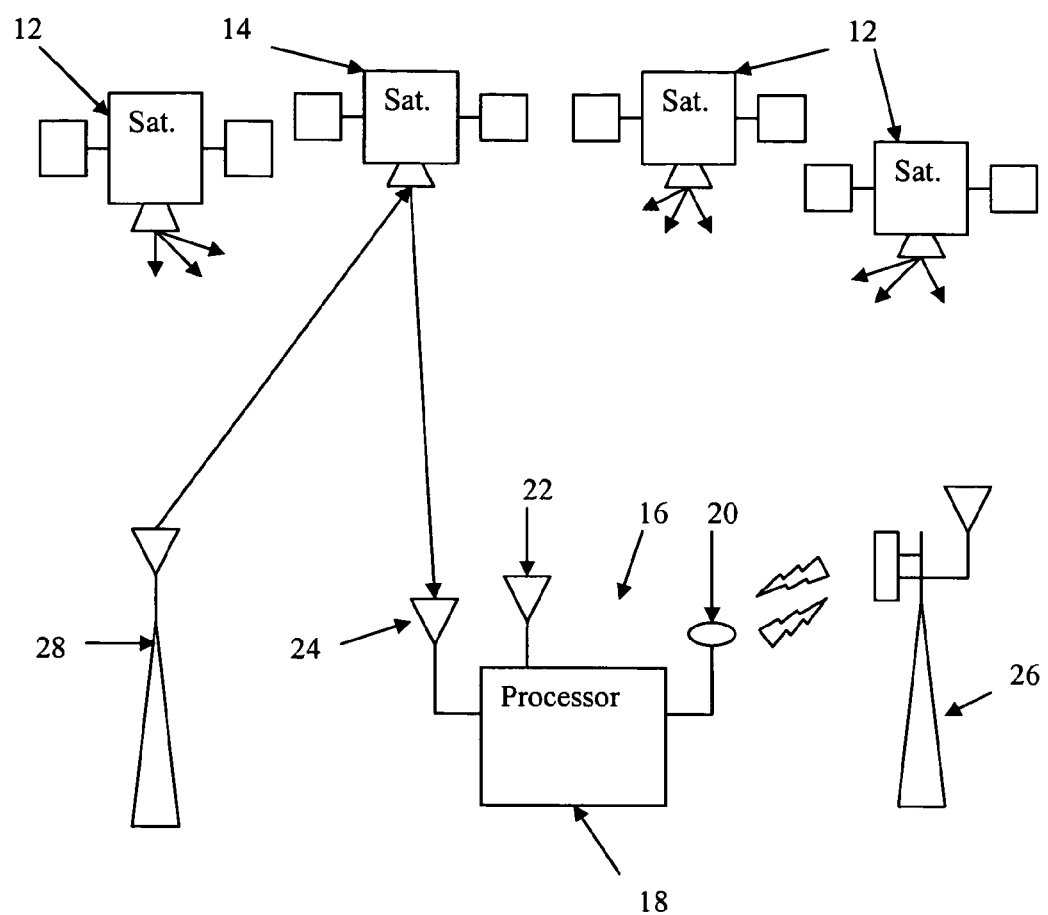
FIG. 1 is a block diagram representing one embodiment of differential positioning with both wide area and local area networks.

FIG. 1 shows an embodiment of a network for determining position with a wide area network and a local area supplement. The network is of any desired scope, such as a worldwide, continent wide, country wide, or region wide network. The network provides increased accuracy through differential corrections, modeling or other navigation measurements using one or more reference stations 26, 28. One or a plurality of mobile or substantially stationary receiver systems 16 may determine a current position more accurately through use of the network. The receiver systems 16 may include separate receivers or a combined receiver connected with a satellite communications receiver antenna 24, a ranging signal satellite antenna array 22, and a local communications antenna 20, as will be discussed in more detail below. In an alternative embodiment, the satellite communications for wide area corrections may be replaced with terrestrial communications. The receiver systems 16 or receivers in the receiver system 16 can include transmitter functionality (not shown). A processor 18 represents the processing function of the separate or combined receivers of the receiver system 16.

The network includes a wide area network and a local area supplement (which can be either a local area network or a single local area base station). The wide area network uses a plurality of navigation satellites 12 and includes a communications satellite 14 and a plurality of reference stations 28. The wide area network is WAAS, OmniStar, Starfire, or other now known or later developed wide area network. The communications satellite 14 can be, for example, a geosynchronous or a low earth orbit satellite, and provides differential correction information to the receiver system 16. Typically, fewer reference stations 28 are provided for a given area of coverage in a wide area network than in a local area network. For example, global coverage for a wide area network may be provided by as few as 10 reference stations although typically, more would be used. In contrast, a local area network with 10 reference stations would typically cover an area on the order of 90,000 square kilometers.

The reference stations 28 transmit differential corrections directly to the satellite 14 or send differential corrections to a central facility (not shown) for uplink. Weather based model information for further improving location calculation may also be used. For example, the central facility provides the differential corrections and any model information to the satellite 14 for beaming to receiver systems 16. The satellite 14 communicates the corrections to specific receiver systems 16 or broadcasts the corrections for use by any receiver system 16. The receiver system 16 determines location with differential based accuracy. The location is determined from ranging signals (e.g., GPS signals) transmitted by navigation satellites 12, from differential corrections transmitted by the communication satellite 14, and from any model information. In some embodiments, the navigation satellites 12 and communication satellite 14 are all the same kind of satellites performing both ranging (i.e., navigation) and communication functions.

The local area network includes one or more reference stations 26. At a given time, the reference stations 26 are near, such as within tens of miles, to the receiver system 16. The reference stations 26 receive signals from the navigation satellites 12 and generate differential corrections. Using wireless communications, such as radio modems, cellular communications, or other communications, the reference station or stations 26 provide(s) the differential corrections and any model information to the receiver system 16. Any model information may be transmitted by the local area system, the wide area system, or both. The receiver system 16 receives the differential corrections and any model information transmitted by the local area system with the communications antenna 20.

In one embodiment, the local area network is a virtual reference station system. The reference stations 26 provide differential information for real-time kinematic positioning. Alternatively, the reference stations 26 provide non-real-time differential information for positioning. A single local reference station 26 may be used. Alternatively, if a plurality of reference stations 26 are used, they may be sparsely positioned, such as in a virtual reference station system (e.g., 50-120 km between stations). Alternatively, the reference stations 26 may be more densely populated. The reference stations 26 are optionally linked together to generate regional area corrections.

In one embodiment, the receiver system 16 requests corrections by transmitting a current estimated position. The transmission preferably uses cellular communications, such as GSM or text messages, but modems or other communications may be used. In response to the position provided by the receiver system 16, the differential corrections for a virtual reference station at or close to the position are estimated from the regional area corrections or data from the reference stations 26. The receiver system 16 receives the differential corrections for the virtual reference station and updates the position using the differential corrections and virtual reference station position. In alternative embodiments, the receiver system 16 interpolates information from the reference stations 26. Other local area networks may be used.

Additional, different or fewer components of the wide area network or local area supplement may be provided. One or more of the reference stations 26, 28 of the local area and wide area networks, respectively, may be a same station. The receiver system 16 may be part of or connected with a reference station 26, 28.

The reference stations 26, 28 are base stations that provide reference information for use by other devices. The reference stations 26, 28 preferably include a navigation receiver connected with one or more antennas, a processor, and a transmitter or transceiver connected with an antenna. The transmitter or transceiver is a cellular, radio, modem, wired, land-based, satellite or other communications device. Additional, different or fewer components may be provided. For example, the reference stations 26, 28 may include different communications devices for transmitting and/or receiving from other reference stations 26, 28, the receiver system 16 or a central server. Each reference station 26, 28 may have a same or different configuration. For example, the reference station 26 of the local area network may include a cellular transceiver and a global position system antenna and receiver, and the reference station 28 of the wide area network may include a global position system antenna, receiver and a connection to either an uplink facility or a satellite transmitter.

The navigation measurements are based on signals received from one or more, preferably four or more, navigation satellites 12. The network communicates the navigation measurements, such as corrections or model related information, to other components of the network. The communications are through the communications satellite 14, terrestrially or combinations thereof. The communications are point-to-point, broadcast or routed within the network using addresses.

The local area and wide area networks preferably operate using the global positioning system, Galileo system or both. Other global navigation satellite systems (GNSS) or combinations of systems, such as the GLONASS system, may be used. The local area and wide area networks may use different satellites 12 or position systems. The navigation satellites 12 transmit spread spectrum or other ranging signals. The satellite signals are used to determine location.

The receiver system 16 determines position using the wide area network and a local area supplement. The receiver system 16 may or may not be capable of substantially moving. For example, the receiver system 16 may be affixed to a vehicle (intended to move), to a stationary device used for system integrity monitoring (intended not to substantially move), or to a semi-stationary object such as a bridge or building (intended to move only slightly).

The receiver system 16 preferably includes a processor 18, a local area communications antenna 20, a ranging signal satellite antenna array 22, and a satellite communications receiver antenna 24. The receiver system 16 includes a local area receiver, a wide area receiver, a GNSS (e.g., GPS) receiver, or a fewer number of receivers with combined functionality. Additional, different or fewer components may be provided. For example, the receiver system 16 may receive both local and wide area differential corrections through satellite communications, in which case the communications antenna 20 may be omitted. As another example, the ranging signal satellite antenna array 22 and the satellite communications antenna 24 can be combined in one device. Multiple ranging signal satellite antennas 22 may be provided. Additional receivers may be included, such as for operating with multiple GNSS systems or at different frequencies in a same system.

The local area communications antenna 20 operates with a cellular receiver, satellite receiver, radio frequency receiver, modem, wireless device, wi-fi device, Bluetooth device, wired landline, combinations thereof or other now known or later developed communications receiver. The communications antenna 20 is used for bi-directional communications by a transceiver, but may be used as a receive only device. A separate transmitter may also be provided. In one embodiment, the communications receiver antenna 20 is a cellular antenna connected with a cellular modem device for operating with a virtual reference station system. The communications antenna 20 receives locally or terrestrially transmitted differential information, such as receiving local area differential corrections or a position.

The satellite antenna array 22 includes one or more, such as two or three, antennas operable to receive the ranging signals from the satellites 12. The antennas may be integrated with the receiver system 16 in a housing or on a circuit board, or may be spaced away from but in communication with the receiver system 16. The satellite antenna array 22 receives ranging signals in one or more frequency bands, such as L1, L2 and/or L5 GPS frequency bands. Using tracking or correlation of the signals based on code phase, carrier phase or both code and carrier phases, the receiver system 16 determines a location of each of the antennas in the satellite antenna array 22.

The satellite communications antenna 24 is an antenna of a satellite modem, handset or phone or is an antenna for receiving broadcast satellite communications signals from the satellite 14. The satellite communications antenna 24 receives differential information and any model information from the wide area network. The communications antenna 24 operates for point-to-point or broadcast communications. One or two way communications may be used. In alternative embodiments, the antenna 24 is for terrestrial communications, such as wired or wireless communications. The satellite communications antenna 24 may also be used for receiving local area corrections. For example, regional (wide area) corrections are provided one region at a time. Local corrections for every reference station 26 or for a sampling of reference stations 26 within the region may also be transmitted from the satellite 14. The receiver system 16 uses both the local and wide area corrections from the same communications link.

The processor 18 is a computer, microcontroller, general processor, a digital signal processor, a control processor, a field programmable gate array, an application specific integrated circuit, a digital circuit, an analog circuit, combinations thereof or other now known or later developed device for determining position from satellite signals with or without differential corrections. The processor 18 is a single device, a plurality of devices, a computing network, a card, a circuit board or other arrangement.

The processor 18 substantially continuously determines positions of the satellite antennas 22 from the satellite ranging signals as a function of differential information from the wide area network. "Substantially continuously" is periodically, such as associated with ongoing use, at irregular times or continuously in comparison to usage of local area differential corrections. "Substantially" may account for occasional reliance on gyroscopes or other acceleration sensors updating the position when ranging signals are temporally blocked. The processor 18 sparsely determines at least one position from the ranging signals as a function of (i.e., directly or indirectly using) differential information from the local area network. "Sparsely" is once, intermittently, with a greater period than substantially continuously, or irregularly as an update. "Sparsely" includes collecting a short series of local area corrections, which could be over an interval of time that is short relative to the time period over which a navigation session occurs.

The processor 18 uses the position, differential corrections and/or model information from the local area network in conjunction with performing the wide area position determination. For example, a real time kinematic position is determined from the local area network differential corrections. The position is used to improve estimates of range biases in the wide area network algorithm. As another example, the processor 18 determines a position with the ranging signals and as a function of the local area and wide area differential information. Alternatively, the processor 18 uses the local and wide area differential corrections to determine different positions. The different positions are compared or used separately. As another alternative, the processor 18 estimates a bias for carrier phase measurements and performs position fixes using carrier phase measurements minus this bias estimate using wide area network information. The biases are updated with the local area position information.

In one embodiment, the processor 18 communicates an estimated position to request local correction information when needed or desired. For example, the processor 18 determines a position without differential information. The processor 18 determines the estimated position from ranging signals without differential correction information. The receiver system 16 transmits the non-differential position to the local network. The local network determines differential corrections for a virtual reference station at or near the non-differential position. The communications receiver antenna 20 receives the local area differential corrections in response to the transmission of the non-differential position.

The local area differential information is used as discussed above. For example, current positions of the antennas of the satellite antenna array 22 are determined from the local area differential corrections. The wide area network algorithm processes each current position as a position estimate. With the increased accuracy of the current or local area based position, the estimates of range biases in the wide area network algorithm improve. The position from the local area differential corrections is used as an initial differential position estimate. The local area differential information may be obtained more quickly than the time the wide area network algorithm uses to average any code phase multi-path errors or other unknowns while initializing a differential position. The act of averaging the code phase multi-path errors or unknown may be limited or removed by treating the local area differential correction based position as accurate and processing the wide area differential corrections and the ranging signals with greater accuracy. The ranging biases are more accurate than without the local position information, such as providing a change in accuracy from larger than one meter to at least one meter or better. The phase residuals are a measurement of errors in the wide area corrected ranges. The local position information results in ranging biases with less uncertainty. At the end of a given update or estimation, the covariance matrix is a representation of uncertainty in the estimate, such as the estimate of range biases.

Initially using the local area based differential position may reduce a startup time of the wide area network position determination. Steady state accuracy of the wide area differential position may be obtained more rapidly, eliminating or reducing the 5-20 minute convergence of wide area networks. The initial wide area differential position with a desired accuracy, such as 5-12 inch accuracy, is more rapidly determined than determination without local area position information. For example, the OmniSTAR HP system has a typical convergence time of about 20 minutes. To improve the convergence time, the OmniSTAR HP system can be started from a known position or seed point. The seed point is treated as a known start position. The wide area network algorithm reads the current seed point.

Phases or corrections from the local area network may alternatively or additionally be used in the wide area processing with or without position determination based on the local area corrections.

The processor 18 determines additional positions substantially continuously from wide area differential information rather than from additional local area differential information. Substantially all the subsequent positions are determined without further differential information from the local area network. The processor 18 occasionally updates the position using local area differential corrections, such as updating when communications with the communications satellite 14 are interrupted, updating to verify proper performance of the wide area network, or updating due to losing track of several ranging satellites 12 and thereby requiring initialization or re-initializing of wide area ranging biases. No further updates with local area information are performed in other embodiments.

Sparse use of the local area differential corrections may limit costs associated with the local area network. For example, the local area network may be more expensive to use than the wide area network. The local area network is used to avoid delays, but otherwise the wide area network is used.

The processor 18 determines code and/or carrier phase based positions from the ranging signals and the differential corrections from one or more reference stations 26, 28 that received the same ranging signals. The receiver system 16 tracks one or more of the following signal sources: GPS L1 signals, GPS L2 signals, GPS L5 signals, GLONASS signals, GALILEO signals, pseudolite signals at any frequency, and/or synchrolite signals at any frequency. The receiver system 16 may track other now known or later developed signals for navigation or position determination. In one embodiment, the navigation receiver system 16 includes a GPS L1+L2 receiver. In addition to differential information, model information may be used to refine the position determination.

Figure 2:
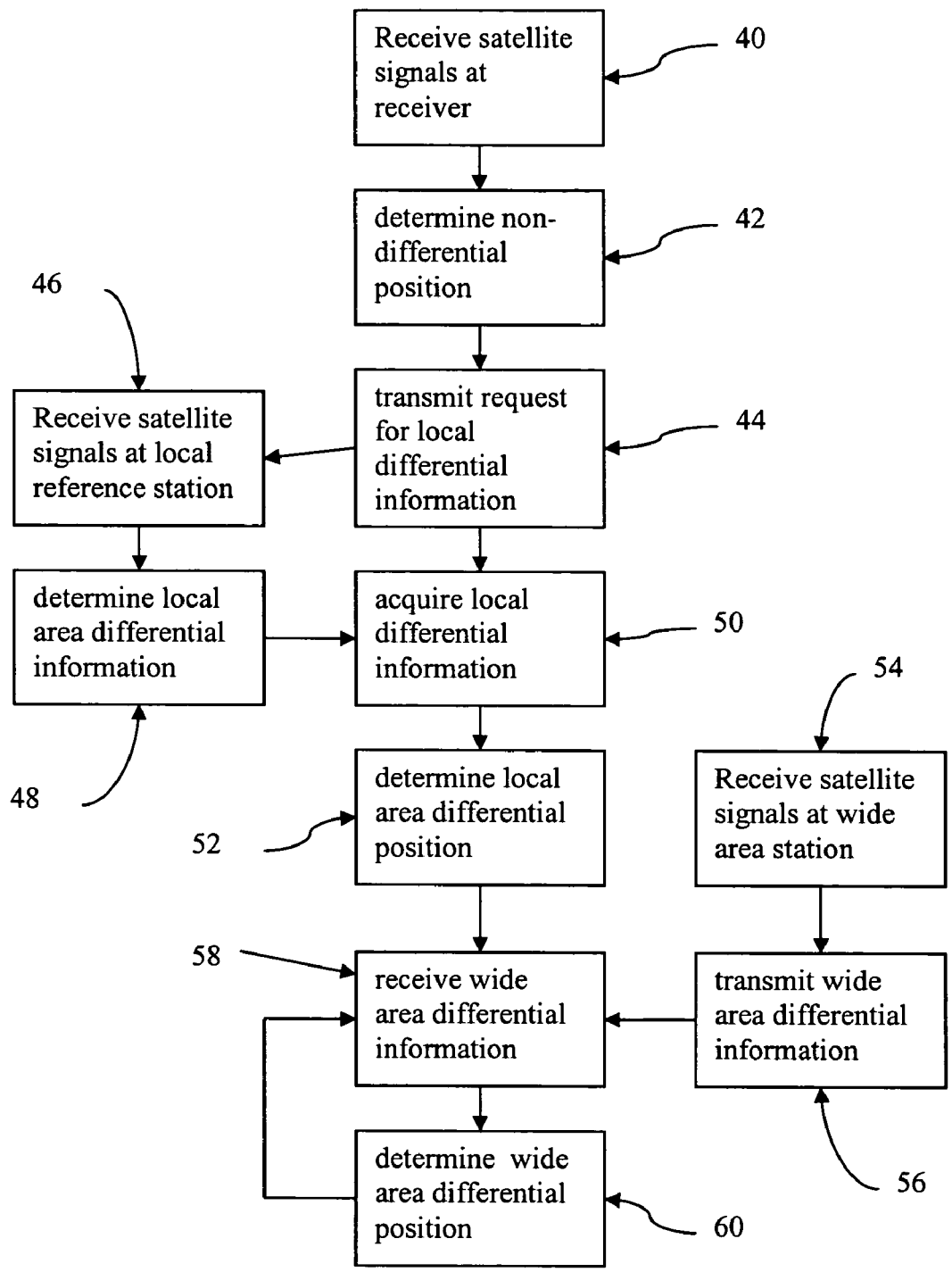
FIG. 2 is a flow chart diagram of one embodiment of a method for determining position with a wide area network and a local area supplement.

FIG. 2 shows a method for determining position with a wide area network and a local area supplement. The method uses the network of FIG. 1 or a different network. The acts shown in FIG. 2 are performed in the order shown or a different order. Additional, different or fewer acts may be provided.

In act 40, ranging signals are received at a receiver. One or more antennas receive navigation signals from one or more navigation satellites. For example, navigation signals from four or more satellites are received on a single antenna or separate antennas. In one embodiment, the receiver associated with an automatic steering of farm or mining equipment receives the signals. The process begins once the receiver boots or turns on. In acts 46 and 54, local and wide area reference stations, respectively, receive the same ranging signals. Alternatively, different ranging signals are received.

In act 42, a non-differential position is determined. The receiver tracks the ranging signals and determines a code phase based position. The accuracy of the non-differential position may be a meter or worse.

In act 44, the receiver requests local differential information. For example, transmission of the non-differential or another position is treated as a request for virtual reference station corrections. In alternative embodiments, local differential information is not specifically requested, such as where the local differential information is broadcast or generally available from reference stations within a local area of the receiver.

In act 48, local area differential information is determined from the ranging signals received in act 46. The local differential information includes differential corrections, such as difference between a position determined from ranging signals and a known position. Model information may also be determined.

In act 50, the receiver acquires the local area differential information. In response to the request of act 44 or without response to a request, the receiver receives a local area differential position or corrections. For example, virtual reference station information is received in a two-way cellular communication.

In act 52, the receiver sparsely determines at least one position from ranging signals as a function of the differential information from the local area network. For example, the receiver uses the local area differential information to determine a single initial differential position of the receiver. As another example, the receiver determines positions with the local area differential information until positions determined with wide area differential corrections are available. As another example, periodic updates using local area differential corrections are performed. Act 52 may be omitted, and local area phases or corrections may be directly sent to wide area algorithms.

In act 54, ranging signals are received at one or more wide area reference stations. Differential corrections and/or other information are compiled at an uplink facility. The differential information is transmitted via a satellite or other link in act 56. In act 58, the receiver receives the wide area differential corrections.

In act 60, one or more positions are determined from the satellite ranging signals as a function of the differential information from the wide area network. In one embodiment, the position is a function of the differential information from the local area network as well as from the wide area network. For example, the position determined in act 52 is an initial position estimate used to determine position with the wide area differential corrections. A position algorithm of the wide area network treats the position from the local area differential corrections as an accurate initial estimate or otherwise uses the local position information to increase confidence in range biases. The initial wide area position or ranges are a function of the local area position, possibly reducing errors in calculating position and averaging of code phase multi-path errors.

An example algorithm below uses an initial local area position fix to initialize biases that are subsequently used to improve wide area position fixes. The algorithm runs using Matlab or Octave software on a Windows, Linux or other operating system, but may be incorporated into a receiver. The "%" symbol in the algorithm designates comments on the operations of the algorithm.

```
% example positions (x,y,z) in a Cartesian earth-fixed frame for six satellites
satpos=[15961617.527877         -5568288.875524
   20581213.045616  -927367.252836  -25555667.199965
   6782852.988405  -15657623.274079  -8590239.427077
   20348851.042513  7335261.017331  -25376884.497215
   2763836.411380  -7896805.819584  -18990523.571557
   16761974.833337  11615133.665710  -19197353.939169
   13835407.352859];

% example known antenna position determined from a local area differential position fix
xtrue=[-394955.0 -4609709.0 4376212.5];

% calculate vectors from the antenna to the six satellites
nsv=size(satpos,1);
user2sat=satpos-ones(nsv,1)*xtrue;

% code phase measurements with wide area corrections
phc=[23044694.258503;
   21090476.354498;
   22448124.537412;
   22217817.321159;
   20408146.056544;
   21130961.623491];

% find phase residual which is sum of clock error plus phase biases plus correction errors
b=phc-rownorm(user2sat);
b=b-mean(b); % throw out bulk of clock term by subtracting the mean (optional)

% subtract the residual vector b from subsequent wide area corrected phases, such as wide area corrected phases for satellite positions received one second later and given below
satpos2=[15963579.126043         -5566589.617674
   20580155.020073  -926976.535452  -25556495.186850
   6779813.040272  -15655436.514941  -8591345.504115
   20350063.715315  7335471.774218  -25376493.654841
   2766983.390926  -7896324.687382  -18992606.309080
   16759856.202796  11615338.435085  -19195534.845639
   13837763.701150]

user2sat2=satpos2-ones(nsv,1)*xtrue;

% wide area corrected phases for the one second later example
phc2=[23045272.161773
   21090942.285203
   22447697.029318
   22217297.299196
   20408151.338957
   21130877.335941]

% guess position for the one second later example—here is different by 2 in x, 3 in y and 4 in z
guesspos=xtrue+[2 3 4];

% position fix one second later using only wide area corrections
p=findpos(satpos2, phc2-b, guesspos)

Here is the function findpos:
function pos=findpos(satpos, phase, guesspos)
   nsv=size(satpos,1);
   % vectors from user to satellites
   user2sat=[ ];
   G=[ ]; % GPS observation matrix, linearized for guesspos
   nsv=size(satpos,1);
   pos=guesspos;
   for si=1:nsv
   user2sat=[user2sat; satpos(si,:)-pos];
   G=[G;[user2sat(si,:)/norm(user2sat(si,:))1]];
   end
   dpost=G\(phase-rownorm(user2sat));
   pos=pos-dpost(1:3)';

And here's a simple rownorm function:
function rn=rownorm(m)
rn=sqrt(sum(m'.^2)');
```

In another example of act 60, a wide area network system that estimates a bias for carrier phase measurements and performs position fixes using carrier phase measurements minus this bias estimate can be modified to update those biases with local area position information. An example algorithm is given below. The algorithm runs using Matlab or Octave software on a Windows, Linux or other operating system, but may be incorporated into a receiver. The "%" symbol in the algorithm designates comments on the operations of the algorithm.

```
% For example, say that the wide-area corrected carrier phases at the
% initial time are:
carc=[
   121100694.3310298
   110831214.0910975
   117965715.8374039
   116755449.8492527
   107245561.1062033
   111043989.6483953];
```

% and one second later are:

carc2=[
   121103731.2332110
   110833662.5734782
   117963469.2672068
   116752717.1153927
   107245588.8654710
   111043546.7143305];

wavelength=0.190293672798; % L1 wavelength in meters

% initialize a carrier bias cb=carc*wavelength−phc;

% initialize bias estimate covariance errcov=4; % meters squared

P=eye(nsv)*errcov;

% local area update

L=null(ones(nsv,1)')'; % premultiplying by this matrix removes clock updatecov=eye(nsv−1)*0.01; % confidence in local area info % perform kalman filter measurement update to incorporate local area % differential information—this is the additional step for the local area % supplemental information

[cb, P]=kalmanmeas(L*(carc*wavelength−rownorm (user2sat)), L, cb, P, updatecov);

% continue to run smoothing filter with new data

[cb, P]=kalmanmeas(carc2*wavelength−phc2, eye(nsv), cb, P, errcov*eye(nsv));

% perform a position fix using new carrier phases

% corrected with the bias estimate (and without any new local area information)

findpos(satpos2, carc2*wavelength−cb, guesspos)

The Kalman filter measurement update function is given as:

function [xplus, Pplus]=kalmanmeas(meas, obs, xminus, Pminus, meascov)

% function [xplus, Pplus]=kalmanmeas(meas, obs, xminus, Pminus, meascov)

nstate=length(xminus);

k=Pminus*obs'*inv(obs*Pminus*obs'+meascov);

ko=k*obs;

xplus=xminus+k*(meas−obs*xminus);

Pplus=(eye(nstate)−k*obs)*Pminus;

As another example for act 60, the local area corrections are compared to the wide area corrections. Differential corrections that are a function of both wide and local area corrections are used to determine the position. Similarly, the local area base station and associated corrections may be treated as a base station in the wide area network.

The process repeats the calculation of position substantially continuously using the wide area differential corrections. For example, acts 40, 54, 56, 58 and 60 repeat. Substantially all or all remaining or subsequent positions are determined without additional differential information from the local area network. Additional positions are a function of wide area differential information and not a function of additional local area differential information.

Referring to FIG. 1, the receiver system 16 includes a computer readable storage medium having stored therein data representing instructions executable by a programmed processor 18 for determining position with a wide area network and a local area supplement. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

In one embodiment, the instructions are for determining an initial differential position as a function of local area network differential information. For example, an initial non-differential position determined from satellite signals is transmitted pursuant to the instructions. The processor receives local area network differential information in response to the transmission of the initial non-differential position. The local area network differential information represents corrections from a virtual or actual reference station. At least one subsequent differential position is determined as a function of wide area network differential information and the initial differential position. For example, the local area network differential information is used only during startup of the wide area network based position determination. The initial differential position is for determining the first subsequent differential position with satellite signals and the wide area network differential information. All or substantially all additional subsequent differential positions are determined as a function of the wide area network differential information and without the local area network differential information. The use of wide area corrections without local area corrections continues from startup of the wide area network based position determination until a subsequent entry into startup for the wide area network based position determination.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for determining position with a wide area network and a local area supplement, the method comprising:
   acquiring local area differential information, wherein acquiring local area differential information comprises actively requesting the information; and initializing or re-initializing wide area differential navigation algorithm with the local area differential information.

2. The method of claim 1 wherein actively requesting is performed via cellular network.

3. The method of claim 1 wherein actively requesting is performed via radio modem.

4. The method of claim 1 wherein the local area differential information is used to calculate a position and the position is used to initialize or re-initialize the wide area navigation algorithms.

5. The method of claim 1 wherein acquiring local area differential information comprises acquiring a local area differential position.

6. The method of claim 1 wherein acquiring local area differential information comprises acquiring local area differential corrections.

7. The method of claim 1 wherein acquiring local area differential information comprises acquiring with cellular communication.

8. The method of claim 1 wherein initializing or re-initializing comprises providing a range bias in the wide area differential navigation algorithm, the range bias associated with more confidence than a previous range bias based on the local area differential information.

9. The method of claim 1 wherein initializing or re-initializing comprises determining an initial differential position with the local area differential information and determining a first position with the differential information from the wide area network based on the initial differential position.

10. The method of claim 1 further comprising determining substantially continuously additional positions as a function of wide area differential information and not as a function of additional local area differential information.

11. The method of claim 1 wherein acquiring the local area differential information comprises determining a wide area or non-differential position from first signals from satellites, transmitting the wide area or non-differential position, and receiving the local area differential information in response to the transmission of the wide area or non-differential position.

12. A position receiver for determining position with a wide area network and a local area supplement, the position receiver comprising:
a communications antenna operable to receive local area differential information;
a first satellite antenna operable to receive signals from at least one navigation satellite; and
a processor operable to initialize or re-initialize a wide area differential navigation algorithm with the local area differential information and the signals wherein the processor is operable to request the local area differential information.

13. The position receiver of claim 12 further comprising a second satellite antenna operable to receive the differential information from the wide area network.

14. The position receiver of claim 12 wherein the communications antenna comprises a cellular antenna and the local area differential information comprises information from a cellular network.

15. The position receiver of claim 12 wherein a position derived from the local area differential information is used to initialize the wide area differential navigation algorithm.

16. The position receiver of claim 12 wherein the processor is operable to determine an initial differential position with the local area differential information and determine a first position with differential information from the wide area network as a function of the initial differential position.

17. The position receiver of claim 12 wherein the processor is operable to determine substantially continuously additional positions as a function of wide area differential information and not as a function of additional local area differential information.

18. The position receiver of claim 12 wherein the processor is operable to determine a wide area or non-differential position from the signals from the at least one navigation satellite, and wherein the communications antenna is operable to transmit the wide area or non-differential position and operable to receive the local area differential information in response to the transmission of the wide area or non-differential position.

19. A method for determining position with a wide area network and a local area supplement, the method comprising:
substantially continuously determining positions of a receiver from satellite signals as a function of differential information obtained from the wide area network; and
sparsely determining at least one position of the receiver using differential information obtained from a local area network.

20. The method of claim 19 wherein sparsely determining at least one position of the receiver using differential information obtained from a local area network comprises using the differential information from the local area network and the differential information from the wide area network.

21. The method of claim 20 wherein using comprises using the differential information from the local area network to initialize determination by the wide area network.

22. The method of claim 21 wherein substantially all remaining positions determined as a function of information obtained from the wide area network are determined without differential information from the local area network.

23. The method of claim 19 wherein sparsely determining the at least one position comprises determining an initial differential position as a function of the differential information from the local area network, the initial differential position used to increase a confidence in a range bias by a wide area differential navigation algorithm.

24. The method of claim 19 further comprising:
requesting the differential information from the local area network.

25. The method of claim 19 wherein sparsely determining the at least one position comprises acquiring information with cellular communication or a radio modem.

26. A receiver system for determining position with a wide area network and a local area supplement, the receiver system comprising:
a communications antenna operable to receive local area differential information;
a satellite antenna operable to receive signals from at least one navigation satellite; and
a processor, coupled to the communications antenna and the satellite antenna, operable to substantially continuously determine positions of the satellite antenna from the signals from the at least one navigation satellite as a function of differential information from the wide area network, and sparsely determine at least one of the positions of the satellite antenna using differential information from a local area network.

27. The receiver system of claim 26 wherein the processor is operable to use the differential information from the local area network to determine a local area based position.

28. The receiver system of claim 26 wherein the processor is operable to use the differential information from the local area network to initialize determination of the at least one position as a function of the differential information from the wide area network.

29. The receiver system of claim 28 wherein substantially all subsequent positions are determined without additional information from the local area network.

30. The receiver system of claim 26 wherein sparsely determining the at least one position comprises determining a single initial differential position as a function of the differential information from the local area network, the initial differential position used to increase a confidence in a range bias by a wide area differential navigation algorithm.

31. The receiver system of claim 26 wherein the processor is operable to request with the communications antenna the differential information from the local area network.

32. The receiver system of claim 26 wherein sparsely determining the at least one position comprises acquiring information with cellular communication.

33. In a computer readable storage medium having stored therein data representing instructions executable by a programmed processor for determining position with a wide area network and a local area supplement, the storage medium comprising instructions for:
    determining an initial differential position as a function of local area network differential information with or without wide area network differential information; and
    determining a first subsequent differential position as a function of wide area network differential information and the initial differential position;
    wherein the local area network differential information is used only during startup of wide area network based position determination.

34. The instructions of claim 33 wherein all additional subsequent differential positions are determined as a function of the wide area network differential information and without additional local area network differential information, the all additional subsequent differential positions being from startup of the wide area network based position determination until a subsequent entry into startup for the wide area network based position determination.

35. The instructions of claim 33 wherein determining the initial differential position comprises determining the initial differential position with virtual reference station information.

36. The instructions of claim 33 wherein determining the initial differential position comprises determining an initial non-differential position from satellite signals, transmitting the initial non-differential position, and receiving the local area network differential information in response to the transmission of the initial non-differential position.

37. The instructions of claim 33 wherein determining a first subsequent differential position as a function of wide area network differential information and the initial differential position comprises using the initial differential position to increase a confidence in a range bias for determining the first subsequent differential position with satellite signals and the wide area network differential information.

* * * * *

UNITED STATES PATENT AND TRADEMARK OFFICE
CERTIFICATE OF CORRECTION

PATENT NO. : 7,653,399 B2
APPLICATION NO. : 11/315657
DATED : January 26, 2010
INVENTOR(S) : David G. Lawrence It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twenty-third Day of November, 2010

David J. Kappos
*Director of the United States Patent and Trademark Office*